US009823692B2

(12) United States Patent
Fitzgerald et al.

(10) Patent No.: US 9,823,692 B2
(45) Date of Patent: Nov. 21, 2017

(54) METHODS AND DEVICES FOR SEALING HARD DRIVES

(71) Applicant: Seagate Technology LLC, Cupertino, CA (US)

(72) Inventors: David G. Fitzgerald, Lafayette, CO (US); Jerome Thomas Coffey, Boulder, CO (US); Samuel Edward Severson, Longmont, CO (US); David R. Lapp, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/138,082

(22) Filed: Apr. 25, 2016

(65) Prior Publication Data

US 2017/0308114 A1 Oct. 26, 2017

(51) Int. Cl.
*G06F 1/16* (2006.01)
*H02G 3/22* (2006.01)

(52) U.S. Cl.
CPC ............... *G06F 1/16* (2013.01); *H02G 3/22* (2013.01)

(58) Field of Classification Search
CPC ..................... G06F 1/16; H02G 3/22
USPC ........................................................ 174/559
See application file for complete search history.

(56) References Cited

U.S. PATENT DOCUMENTS

| 6,970,322 | B2 | 11/2005 | Bernett | |
| 7,123,440 | B2 * | 10/2006 | Albrecht | G11B 33/1466 360/99.18 |
| 7,911,732 | B2 | 3/2011 | Hatchett et al. | |
| 7,986,490 | B2 | 7/2011 | Hirono et al. | |
| 8,179,631 | B2 | 5/2012 | Aoyagi et al. | |
| 8,705,202 | B2 | 4/2014 | Hirono et al. | |
| 9,001,458 | B1 * | 4/2015 | Vitikkate | G11B 25/043 360/97.22 |
| 9,230,598 | B1 | 1/2016 | Bernett et al. | |
| 9,236,072 | B1 | 1/2016 | Lee | |
| 9,460,756 | B1 * | 10/2016 | Forbord | G11B 33/14 |
| 2007/0086273 | A1 * | 4/2007 | Polany | H04B 11/00 367/131 |
| 2007/0294777 | A1 * | 12/2007 | Kobayashi | G11B 33/08 726/34 |
| 2009/0097163 | A1 * | 4/2009 | Suzuki | G11B 33/1466 360/245.8 |
| 2013/0170074 | A1 * | 7/2013 | Hayakawa | G11B 33/148 360/97.22 |
| 2015/0098178 | A1 * | 4/2015 | Otake | G11B 33/1446 361/679.33 |
| 2015/0332733 | A1 | 11/2015 | Lapp et al. | |

* cited by examiner

*Primary Examiner* — Timothy Thompson
*Assistant Examiner* — Charles Pizzuto
(74) *Attorney, Agent, or Firm* — Faegre Baker Daniels LLP

(57) ABSTRACT

A hard drive includes a base deck and process cover that define a cavity for housing data storage components. The hard drive further includes a final cover that is placed over the process cover and is coupled to the base deck. The final cover and process cover are directly coupled to each other.

20 Claims, 6 Drawing Sheets

METHODS AND DEVICES FOR SEALING HARD DRIVES

In certain embodiments, a hard drive includes a base deck and a process cover that define a cavity for housing data storage components. The hard drive further includes a final cover that is coupled to the base deck and overlays the process cover. The final cover and process cover are directly coupled to each other.

In certain embodiments, a method includes coupling a process cover to a base deck to define a first portion of the internal cavity and coupling a top cover—including a metal and an aperture—to the base deck to cover to define a second portion of the internal cavity between the top cover and the process cover. The method further includes filling the first portion of the internal cavity with a low-density gas and filling the second portion of the internal cavity with a low-density gas. The method further includes mixing the metal of the top cover to close the aperture.

In certain embodiments, an apparatus includes a base deck comprising a first metal and defining an aperture. The apparatus further includes a top cover, wherein the top cover and base deck are coupled together to define a cavity for housing data storage components. The apparatus further includes an electrical feed-through assembly including a second metal different than the first metal of the base deck. The electrical feed-through assembly is at least partially positioned in the aperture of the base deck. A joint directly coupled the base deck and electrical feed-through assembly, and is formed of a mixed composite of the first and second metals.

DETAILED DESCRIPTION

Data storage devices, like hard disc drives, can be filled with air or a lower density gas, such as helium, and sealed to control and maintain a storage device's internal environment. Sealing mitigates or prevents leakage of internal gases from within a storage device. One potential source of leaks in a data storage device involves the interface between a base deck and a cover, which are coupled together to define an internal cavity. Another source of leaks involves the interface between the base deck and electrical connectors that facilitate electrical and communication signals to and from the internal cavity. Yet another source of leaks involves an interface through which gas is injected into the internal cavity. Some attempts to prevent leaks near the above-mentioned interfaces involve laser welding, metallic seals, adhesive-filled labyrinths, swages, and solder-filled interfaces—each of which presents unique manufacturing challenges. The inventors have found that data storage devices can be modified and combined with aspects of friction stir welding to seal various interfaces of a data storage device. Certain embodiments of the present disclosure are accordingly directed to systems, devices, and methods for sealing data storage devices.

Figure 1:
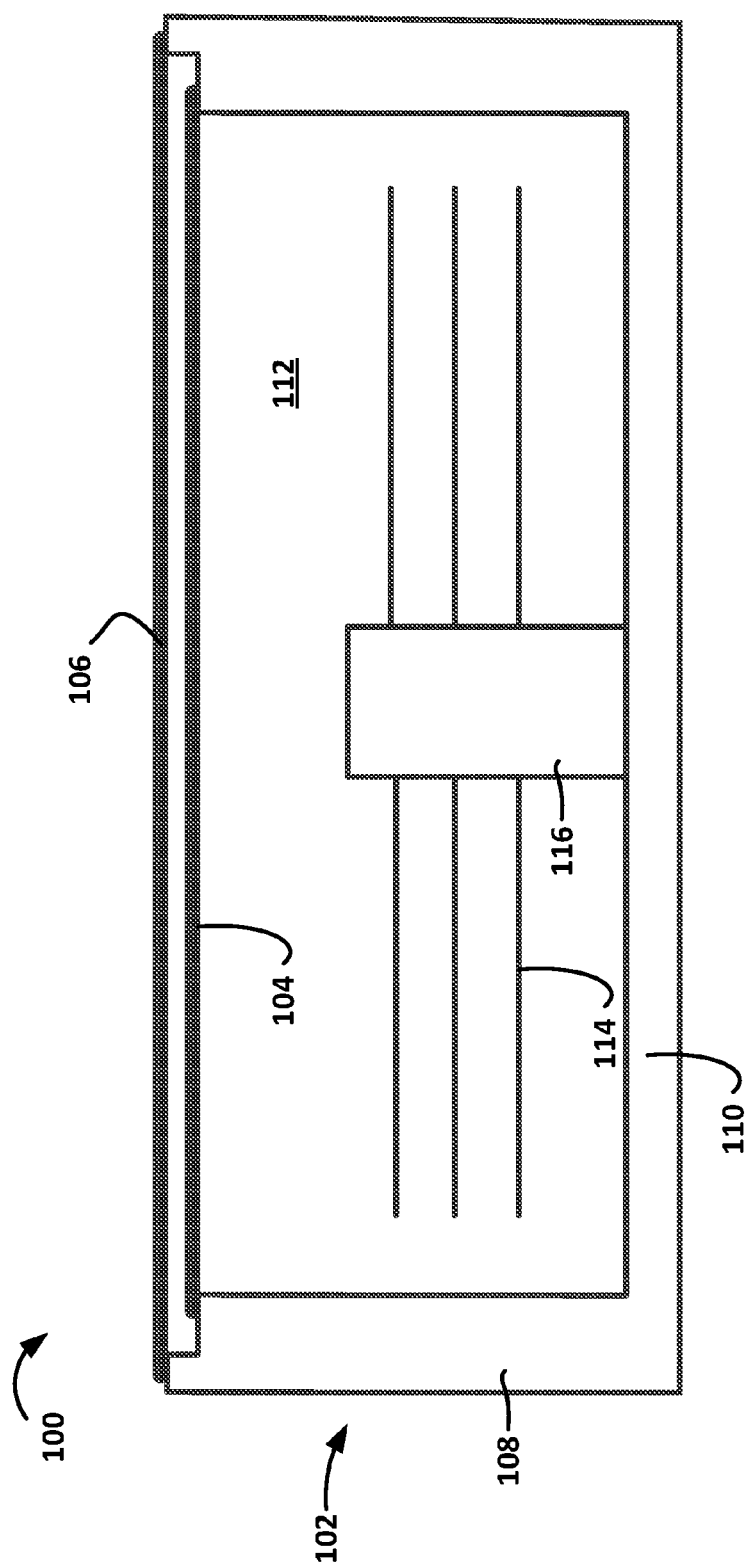
FIG. 1 shows a cut-away side view of a hard drive, in accordance with certain embodiments of the present disclosure.
Figure 2:
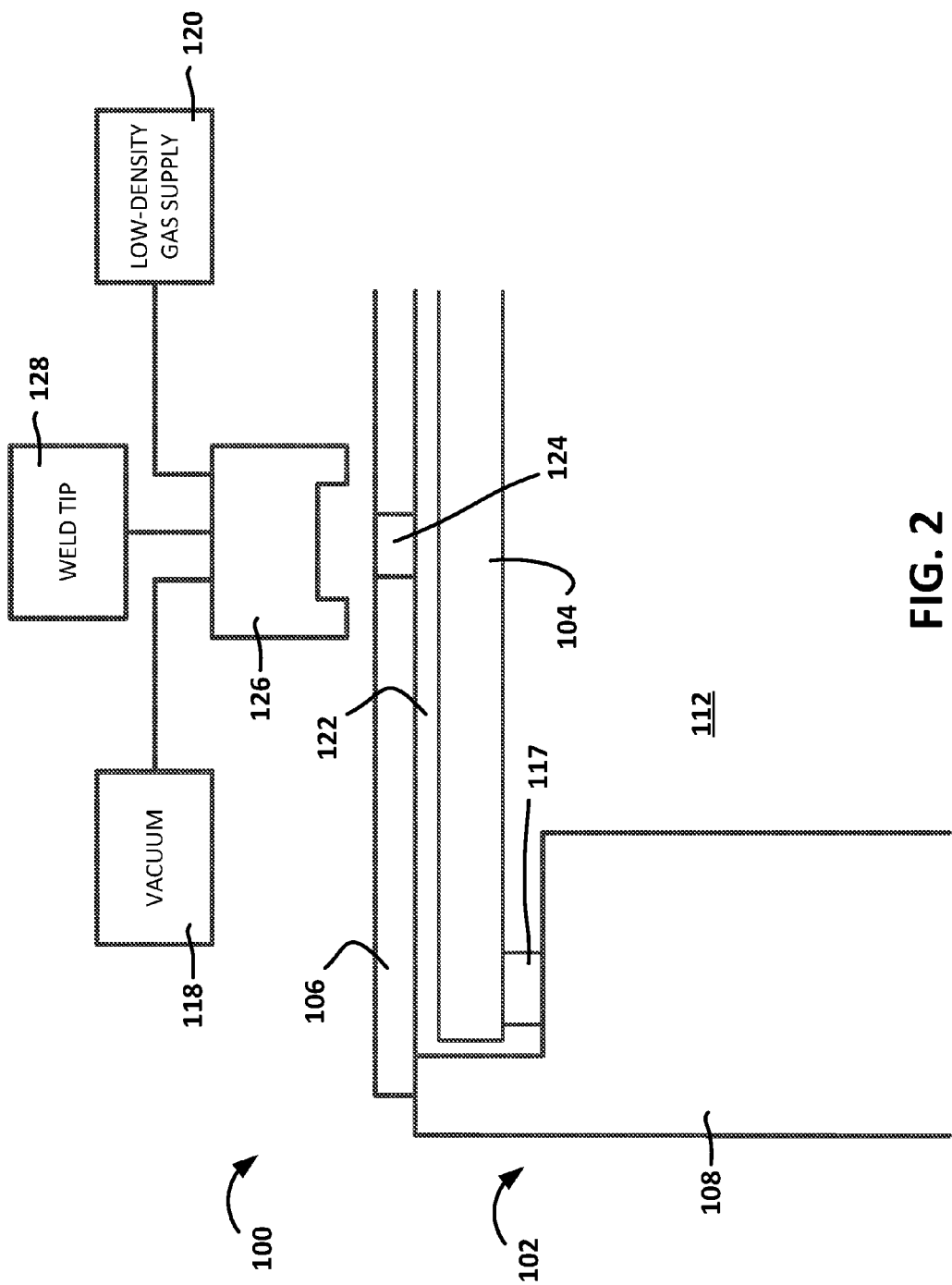
FIG. 2 shows a cut-away side view of an upper portion of the hard drive of FIG. 1, in accordance with certain embodiments of the present disclosure.

FIG. 1 shows a cut away side view of a hard drive 100 including a base deck 102, process cover 104, and final cover 106. FIG. 2 shows a cut away side view of an upper portion of the hard drive 100. As shown in those figures, the base deck 102 includes side walls (e.g., side wall 108) that, together with a bottom portion 110 of the base deck and the process cover 104, creates an internal cavity 112 that may house data storage components like magnetic recording media 114, a spindle motor 116, etc.

During assembly, the process cover 104 can be coupled to the base deck 102 by removable fasteners (not shown) and a gasket 117 (shown in FIG. 2) to seal a low-density gas, like helium, within the internal cavity 112. Once the process cover 104 is coupled to the base deck 102, a low-density gas may be injected into the internal cavity 112 through an aperture (not shown) in the process cover 104, which is subsequently sealed. Injecting the low-density gas may involve first evacuating gas from the internal cavity 112 using a vacuum 118 and then injecting the low-density gas from a low-density gas supply reservoir 120 into the internal cavity 112. Once the aperture is sealed, the hard drive 100 may be run through various tests.

After the hard drive 100 has been tested, the base deck 102 and final cover 106 can be coupled together to create an internal cavity 122 between the process cover 104 and final cover 106. The base deck 102 and final cover 106 may be coupled together, for example, by welding and the like. For example, friction stir welding (discussed in detail below) may be used to couple the base deck 102 and final over 106. Once the final cover 106 is coupled to the base deck 102, a low-density gas may be injected through an aperture 124 in the final cover 106 to fill the internal cavity 122. To facilitate the filling of the internal cavity 122, a sealing assembly 126 (shown in FIG. 2) may be used. The sealing assembly 126 is shown as being coupled to the vacuum 118, the low-density gas reservoir 120, and a weld tip 128. In use, the sealing assembly 126 may utilize the vacuum 118 to evacuate gas from the internal cavity 122 and then utilize the low-density gas reservoir 120 to inject a low-density gas into the internal cavity 122. For example, the sealing assembly 126 may be moved towards the aperture 124 in the final cover 106 and temporarily coupled to the final cover 106. Once coupled, the sealing assembly 126 may evacuate gas from the internal cavity 122 via the aperture 124 and then inject a low-density gas into the internal cavity 122 via the aperture 124. The aperture 124 must then be sealed or closed to maintain the low-density gas within the hard drive 100 and therefore within the internal cavities 112, 122.

The sealing assembly's weld tip 128 facilitates sealing the aperture 124. Although the weld tip 128 is shown schematically as being coupled to the sealing assembly 126, other arrangements are contemplated by the inventors. For example, the weld tip 128 may be a separate component from the sealing assembly 126. In some embodiments, the weld tip 128 is a friction-stir weld tip. Friction stir welding involves mechanically mixing metal together as opposed to melting metal like traditional welding techniques. As such, the weld tip 128 may facilitate friction stir welding by applying heat to soften metal of the process cover 104 and/or final cover 106 and then mechanically mixing the softened metal.

Figure 3:
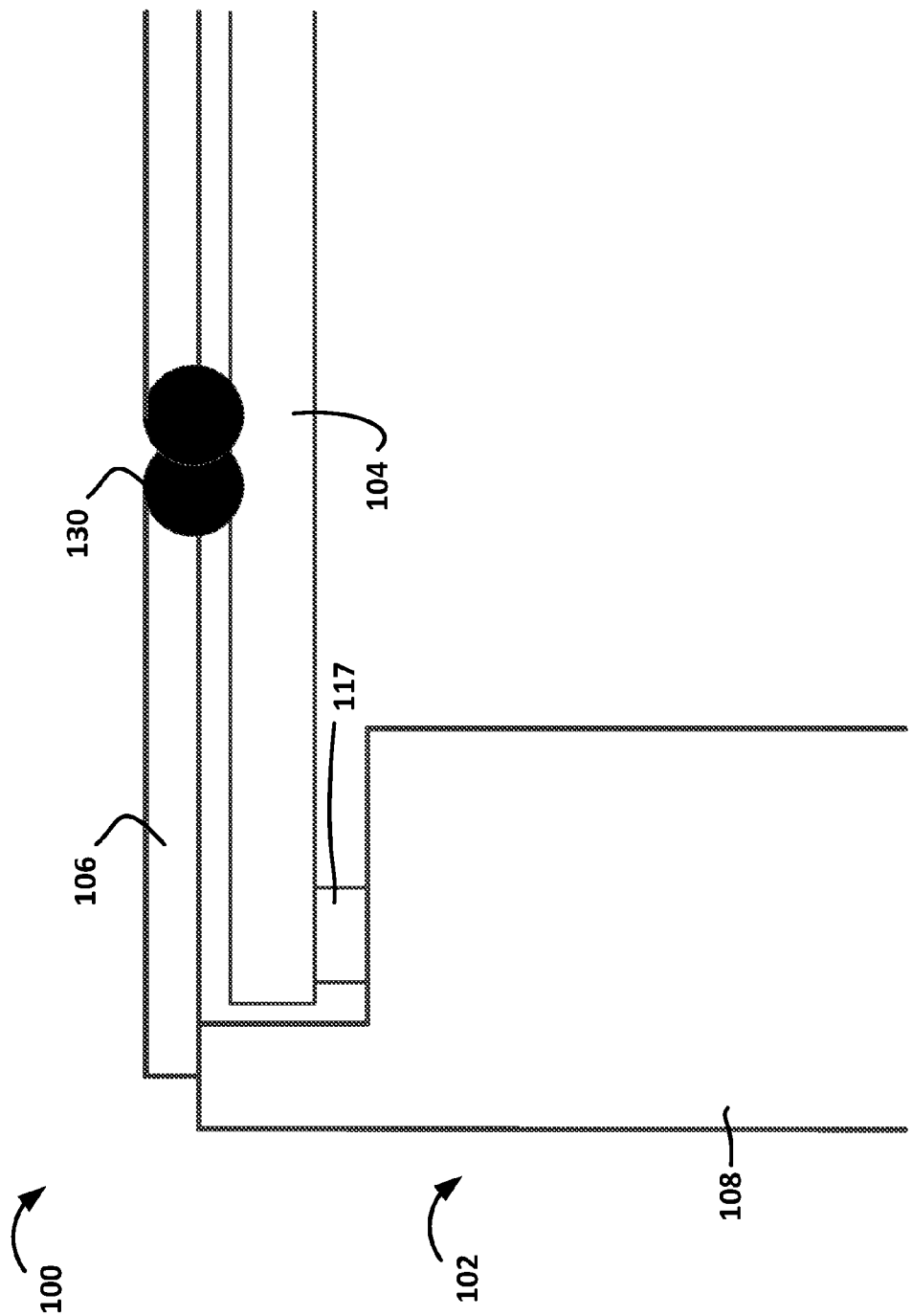
FIG. 3 shows a cut-away side view of an upper portion of the hard drive of FIG. 1, in accordance with certain embodiments of the present disclosure.

FIG. 3 shows a cut away side view of a portion of the hard drive 100 after the aperture 124 has been closed. The hard drive 100 is shown with the process cover 104 and final cover 106 directly coupled together where the aperture 124 (shown in FIG. 2) was formerly positioned. The process cover 104 and final cover 106 are coupled together by mechanically mixing at least a portion of metal of the process cover 104 together with at least a portion of metal of the final cover 106 to create a joint or mixed section 130. The joint or mixed section 130 comprises a composite of the metal from the process cover 104 and the metal from the final cover 106. In some embodiments, metal of the process cover 104 and metal of the final cover 106 are different metals. For example, one cover may be formed of aluminum while the other cover is formed of steel. In such an embodiment, the mixed section 130 would include a mixture of both aluminum and steel. In some embodiments, metal of the process cover 104 and metal of the final cover 106 have different metal compositions from each other. For example, although both covers may be formed of aluminum, one cover may be formed of aluminum alloys, like 5052, 6061, 4047 aluminum and the like, while the other cover may be formed of different type of those aluminum alloys. In some embodiments, the process cover 104 and final cover 106 are formed of the same type of metal.

As shown in FIG. 3, only a portion of the process cover 104 and the final cover 106 are directly coupled together. For example, except for the mixed section 130, the process cover 104 and the final cover 106 are spaced apart from each other. In some embodiments, the process cover 104 and final cover 106 are spot welded together using friction stir welding.

Figure 4:
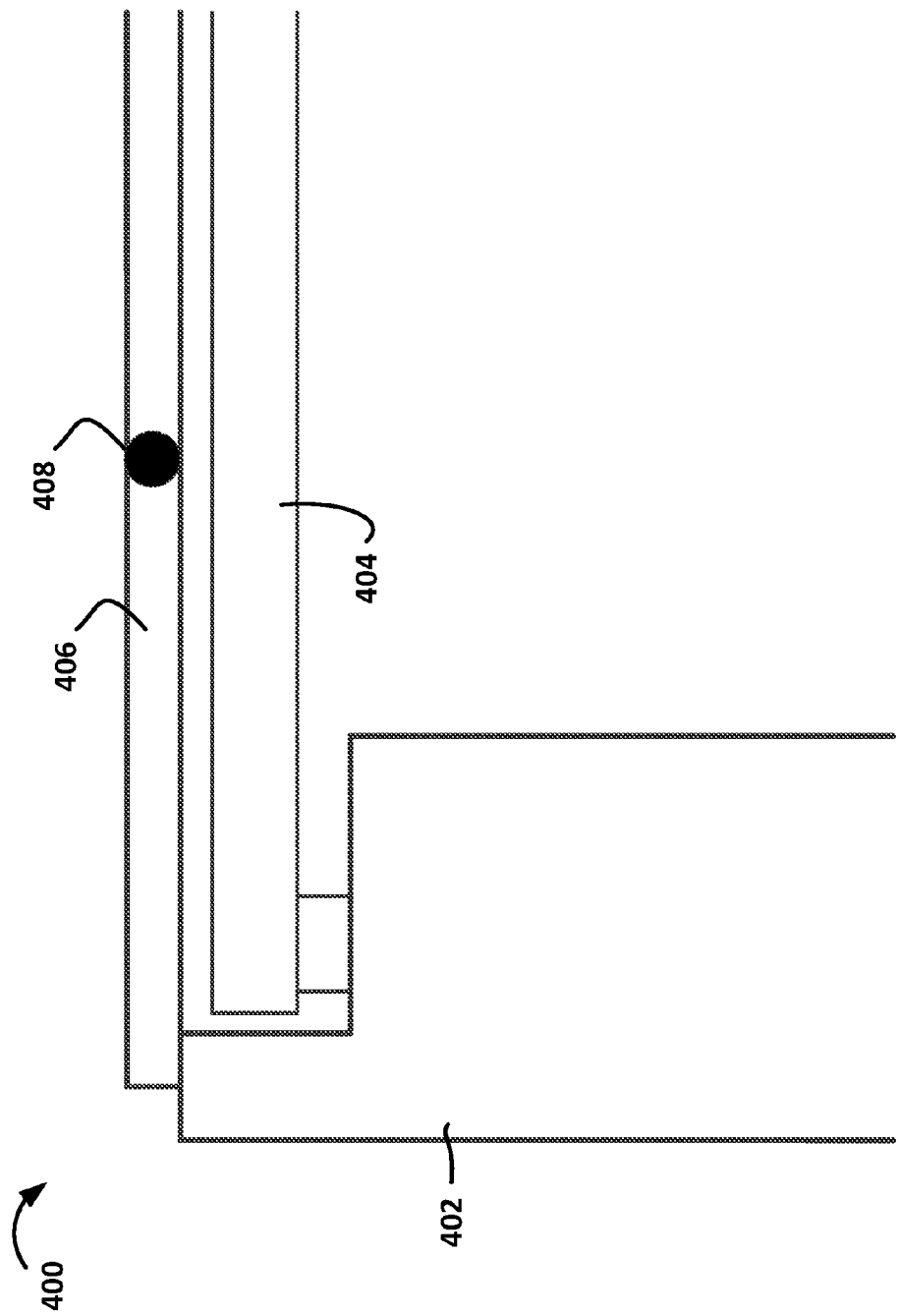
FIG. 4 shows a cut-away side view of an upper portion of a hard drive, in accordance with certain embodiments of the present disclosure.

FIG. 4 shows a cut away side view of a hard drive 400 including a base deck 402, process cover 404, and final cover 406. Similar to the embodiments described above, a low-density gas is injected within the hard drive 400 via various apertures in the process cover 404 and final cover 406, which need to be sealed or closed. The embodiment shown in FIG. 4 features a joint or mixed section 408 created by using a weld tip (like weld tip 128 in FIG. 2) to mechanically mix together metal of the final cover 406 to seal or close an aperture in the final cover 406. In some embodiments, the final cover 406 includes additional material near an aperture such that the additional material is used to close or seal the aperture using friction stir welding. In some embodiments, additional metal is combined with metal of the final cover 406 to form the joint or mixed section 408. The joint or mixed section 408 is the result of utilizing a weld tip to mechanically mix together metal of the final cover 406 to seal or close an aperture. In these embodiments, the process cover 404 and final cover 406 are not directly coupled to each other. The additional material may be the same or a different metal than that of the final cover 406. For example, in some embodiments, the final cover 406 is formed or machined to include additional material near the aperture. In other embodiments, the additional material is added to the final cover 406 after the final cover 406 is formed or machined.

Figure 5:
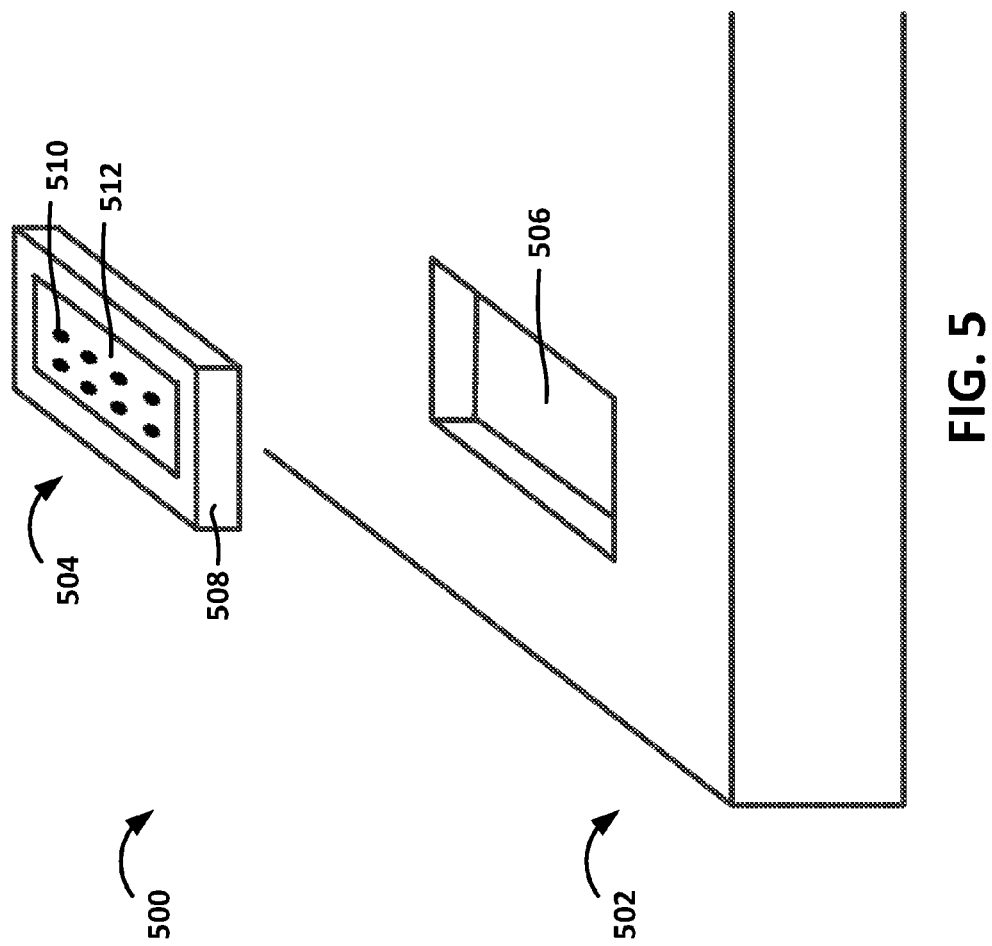
FIG. 5 shows a perspective exploded view of an exterior, bottom side of a hard drive, in accordance with certain embodiments of the present disclosure.
Figure 6:
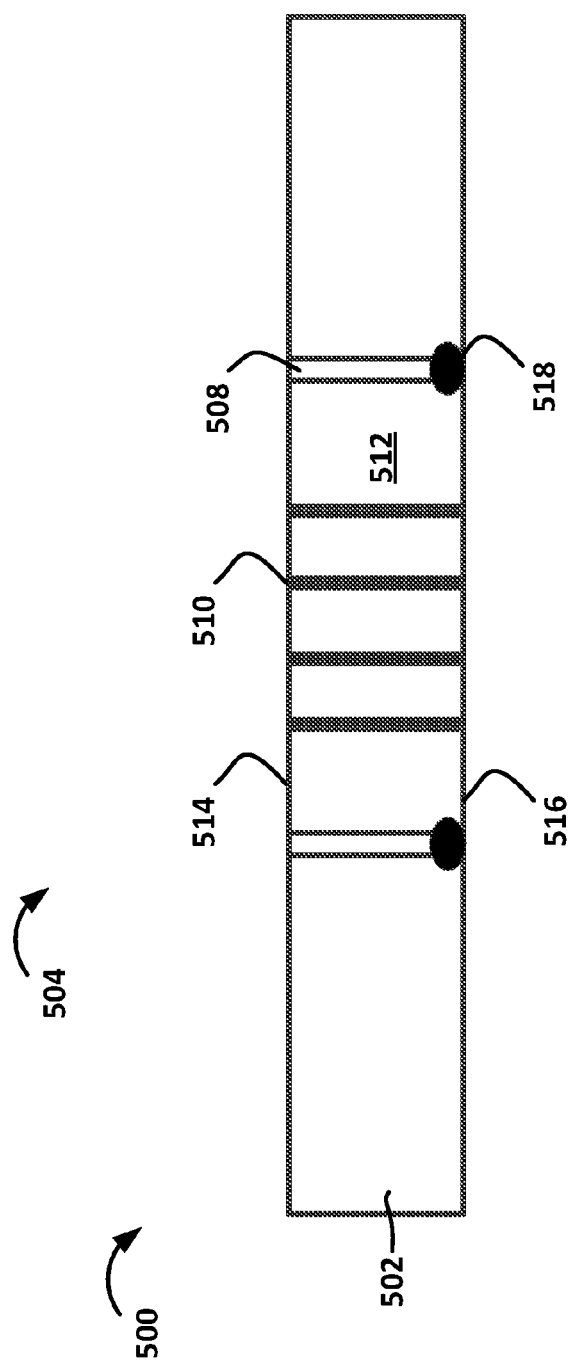
FIG. 6 shows a cut away side view of a portion of the hard drive of FIG. 5, in accordance with certain embodiments of the present disclosure.

FIG. 5 shows a perspective exploded view of an exterior, bottom side of a hard drive 500 including a base deck 502 and an electrical feed-through assembly 504. FIG. 6 shows a cut away side view of the hard drive 500, base deck 502, and electrical feed through assembly 504 coupled to the base deck 502. The base deck 502 includes an aperture 506 in which the electrical feed-through assembly 504 is positioned. The electrical feed-through assembly 504 facilitates transmission of electrical signals to and from the hard drive 500. For example, the electrical feed-through assembly 504 may transmit various signals from a printed circuit board positioned external to the base deck 502 to data storage circuitry and components positioned within the base deck 502. As mentioned above, the interface between the base deck 502 and electrical feed-through assembly 504 can be a source of leaks for hard drives filled with a low-density gas.

The electrical feed-through assembly 504 includes a frame 508 and conductors 510 formed within an interior portion 512 of the electrical feed-through assembly 504. The frame 508 surrounds the interior portion 512 and can be made of metal such as aluminum, steel, and the like. The conductors 510 can transmit electrical signals into and out of the interior portion 512 of the hard drive 500. For example, the conductors 510 may be coupled to a first set of electrical contacts (not shown) at an interior side 514 of the electrical feed-through assembly 504 and coupled to a second set of electrical contacts (not shown) at an exterior side 516 of the electrical feed-through assembly 504. The conductors 510 are positioned within the interior portion 512, which can be made of an insulating material such as glass and the like.

Because the base deck 502 and frame 508 may be made of metal, a weld tip (not shown) can be used to couple the base deck 502 and frame 508 together via friction stir welding. FIG. 6 shows the base deck 502 and frame 508 coupled together such that at least a portion of metal of the base deck 502 is mechanically mixed together with at least a portion of metal of the frame 508 to create a joint or mixed section 518. The joint or mixed section 518 comprises a composite of the metal of the base deck 502 and metal of the frame 508. In some embodiments, metal of the base deck 502 and metal of the frame 508 are different. For example, one component may be formed of aluminum while the other component is formed of steel. In such an embodiment, the mixed section 518 would include a mixture of both aluminum and steel. In some embodiments, metal of the base deck 502 and metal of the frame 508 have different metal compositions from each other. For example, although both components may be formed of aluminum, one component may be formed of aluminum like 5052, 6061, 4047 aluminum alloys and the like, while the other component may be formed of different type of these or other aluminum alloy. In some embodiments, the metal of the base deck 502 and frame 508 are the same type of metal.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. An apparatus comprising:
   a base deck;
   a process cover, the base deck and process cover together defining a cavity for housing data storage components; and
   a top cover coupled to the base deck and positioned over the process cover, the top cover and the process cover being directly coupled to each other, wherein an internal cavity is defined between the top cover and the process cover.

2. The apparatus of claim 1, wherein the top cover is formed of metal and the process cover is formed of metal, and wherein at least a portion of the metal of the top cover is mixed together with at least a portion of the metal of the process cover to form a composite of the top cover and process cover metals.

3. The apparatus of claim 2, wherein the top cover is formed of a first metal and the process cover is formed of a second metal, and wherein the first and second metals are different.

4. The apparatus of claim 3, wherein one of the first and second metals is 5052 aluminum and the other metal of the first and second metals is 6061 aluminum.

5. The apparatus of claim 3, wherein one of the first and second metals is aluminum and the other metal of the first and second metals is steel.

6. The apparatus of claim 3, wherein one of the first and second metals is 4047 aluminum and the other metal of the first and second metals is 6061 aluminum or 5052 aluminum.

7. The apparatus of claim 2, wherein at least a portion of the metal of the base deck and at least a portion of the top cover are mixed together to form a joint including a composite of the top cover and base deck metals.

8. The apparatus of claim 2, wherein the metal of the top cover and the metal of the process cover are the same.

9. The apparatus of claim 1, wherein an edge portion of the process cover is directly coupled to a first surface of the base deck, and wherein an edge portion of the top cover is directly coupled to a second surface of the base deck spaced apart from the first surface.

10. A method for sealing an internal cavity of a hard drive, the method comprising:
coupling a process cover to a base deck to define a first portion of the internal cavity;
filling the first portion of the internal cavity with a low-density gas;
coupling a top cover to the base deck to define a second portion of the internal cavity between the top cover and the process cover, wherein the top cover comprises a metal and includes an aperture;
filling the second portion of the internal cavity with a low-density gas; and
mixing the metal of the top cover to close the aperture.

11. The method of claim 10, wherein mixing the metal of the top cover includes directly coupling the process cover and the top cover.

12. The method of claim 11, wherein the process cover is formed of metal, and wherein directly coupling the top cover to the process cover includes mixing at least a portion of the metal of the top cover with at least a portion of the metal of the process cover to form a composite of the top cover and process cover metals.

13. The method of claim 11, wherein directly coupling the top cover to the process cover including friction-stir welding the top cover to the process cover.

14. The method of claim 10, further comprising:
before coupling the top cover to the base deck, running the hard drive through a series of tests.

15. An apparatus comprising:
a base deck comprising a first metal and defining an aperture;
a top cover, the base deck and the top cover being coupled together to define a cavity for housing data storage components;
an electrical feed-through assembly comprising a second metal different than the first metal of the base deck, the electrical feed-through assembly being at least partially positioned in the aperture of the base deck; and
a joint directly coupling the base deck and electrical feed-through assembly, the joint formed of a mixed composite of the first and second metals.

16. The apparatus of claim 15, wherein the electrical feed-through assembly includes a frame comprising the second metal.

17. The apparatus of claim 16, wherein the electrical feed-through assembly includes an interior portion comprising glass.

18. The apparatus of claim 17, wherein the electrical feed-through assembly includes a plurality of conductors positioned within the interior portion.

19. The apparatus of claim 15, further comprising: a process cover coupled to the base deck and directly coupled to the top cover.

20. The apparatus of claim 19, wherein at least a portion of the top cover is mixed together with at least a portion of the process cover to form a composite of the top cover and process cover.

* * * * *